United States Patent Office 3,541,215
Patented Nov. 17, 1970

3,541,215
METHOD OF RENDERING SUBSTRATES RESISTANT TO FUNGI AND BACTERIA AND RESULTING PRODUCT
Richard E. DeMarco, 7 River Drive, Severna Park, Md. 21146, and Ambrose J. Gibbons, Jr., 101 Locust Ave., Catonsville, Md. 21228
No Drawing. Continuation of application Ser. No. 445,750, Apr. 5, 1965. This application Dec. 23, 1968, Ser. No. 786,857
Int. Cl. A01n *9/00;* A61k *27/00;* A61l *13/00*
U.S. Cl. 424—287          3 Claims

ABSTRACT OF THE DISCLOSURE

Resistance to fungi and bacteria can be imparted to such substrates as synthetic resins, paper, textiles, cement and wood by incorporating to at least the surface portions thereof from about 0.00004% to about 2% by weight of a triorganostannoxy compound having the formula $R_3SnOMR°_{v-1}$ wherein R is an alkyl group having from 1 to 10 carbon atoms or a mixture of said alkyl groups and alkoxy groups having from 1 to 10 carbon atoms; wherein R° can be an alkoxy group having from 1 to 18 carbon atoms or a vinyl group ($CH_2$=CH—), or a mixture thereof, wherein M represents silicon, boron, or a metalliferous unit selected from the group consisting of titanium, antimony, aluminum, and the vanadyl radical, and wherein $v$ represents the valency of the silicon or metalliferous unit. Method of impregnation and resulting impregnated substrates are shown.

---

This application is a continuation of application Ser. No. 445,750, filed Apr. 5, 1965, which is now abandoned.

The present invention relates to the method of using various compounds having the characterizing linkages ≡Sn—O—M= or ≡Sn—O—M≡ to take advantage of their discovered bactericidal, fungicidal and other properties. The compounds correspond to the formula $R_3SnOMR°_{v-1}$, wherein $R_3$ is selected from the class consisting of three alkyl groups having 1–10 carbon atoms in each group, and mixtures of two of said alkyl groups with one alkoxy group having 1–10 carbon atoms; wherein R° can be alkoxy groups having 1–18 carbon atoms and/or vinyl groups ($CH_2$=CH—); wherein M represents a metallic unit selected from the group consisting of the tetravalent metals titanium and silicon, the trivalent metals antimony, aluminum and boron, and the trivalent vanadyl radical ≡VO; and wherein $v$ represents the valency of said metallic unit.

The method of the invention comprises the step of incorporating, impregnating or otherwise physically affixing small, effective amounts of the compound(s) in or to surface portions of the desired substrate, thereby to secure the treated products of the invention. Thus the compound(s) per se can be physically blended with paste-like carrier material (e.g., mixing with paints, adhesives, wet plaster, cement, etc., or by milling with plasticized polyvinyl chloride resins), or can be applied to a desired porous substrate (e.g., cotton, wool or other fabrics, leather, paper and paper products, wood, concrete, plaster, seeds, etc.) in the form of an organic solvent solution of the compound(s) or in the form of an aqueous emulsion of the compound(s). It will be understood that in the two latter instances, the liquid carrier (organic solvent or aqueous emulsion) is dissipated from the treated substrate in any convenient way, as by heating to volatilize the solvent, by allowing the liquid carrier to evaporate at ambient temperatures, or by a combination of such or other treatments seeking to deposit the compounds(s) in the pores and interstices of the substrate. While it is not presently clear what forces act to hold the compounds to the substrate, we have found that the compounds appear to be so firmly affixed to the substrate as to be highly resistant to leaching action by water. Accordingly, the so-treated substrates exhibit good and prolonged resistance to bacterial and fungal encroachment even after being exposed for long periods of time to rain, washing, dampness and/or high humidity. Effective amounts of the compounds range from about 0.00004% to 2%, by weight.

As pointed out in the examples, certain of the compounds which exhibit good bactericidal and fungicidal properties also exhibit other useful properties as well. Thus certain of them exhibit good water-repellant properties (e.g., render paper, fabrics, etc., water-repellant) and some of them, when mixed with urethane foam starting materials, exhibit good ability to catalyze the reaction which occurs to cause formation of useful foams. Accordingly, in certain instances, the use of the compounds of the invention can secure two or more of such beneficial results at the same time.

Accordingly, it is an object of this invention to provide a novel method for treating desired materials (as carriers or substrates) so as to impart valuable fungicidal and bactericidal properties thereto through the use of the ≡Sn—O—M=(—) compounds of the invention.

It is a further object to provide a method of the kind last described which in certain instances additionally uses water-repellant and/or catalytic qualities of the said compounds.

These and related objects of the invention will be understood from the foregoing description of the invention when taken in conjunction with the following examples which illustrate the principles of the invention and include the best modes presently known to us for practicing the invention in accordance with said principles. Examples A–H inclusive give typical methods for preparing the compounds used in practicing the invention, while Examples 1–17 illustrate the method of the invention. Where convenient, the following abbreviations are used in the examples to identify the following indicated organic radicals:

Et=ethyl
Pr=isopropyl
Bu=butyl

EXAMPLE A

Preparation of $Bu_2(OPr)SnOTi(OPr)_3$

Dibutyltin oxide (0.05 mole) is reacted with 0.05 mole titanium isopropoxide in refluxing toluene. Reaction takes place as evidenced by the gradual disappearance of the insoluble dibutyltin oxide. The desired product is in the resulting solution.

A sample of the solution, upon evaporation of the toluene in a Rinco evaporator, leaves a clear yellow liquid $n_D^{24}$ 1.5032. This liquid is sensitive to moisture in the air and forms a white solid on continued exposure. This solid is insoluble in hot toluene and does not melt below 290° C.

The liquid product can also be prepared in the absence of organic solvent by heating equimolar quantities of dibutyltin oxide and titanium isopropoxide at 140–170° C. for about half an hour. The amber liquid has an $n_D^{22}$ 1.4995, and tends to surface harden on exposure to the air.

Calc'd for $C_{20}H_{46}SnTiO_5$ (percent): Sn, 22.2; Ti, 9.0. Found (percent): Sn, 21.84; Ti, 9.15.

EXAMPLE B

Preparation of $Bu_3SnOTi(OPr)_3$

Tributyltin acetate (0.8 mole) and titanium isopropoxide (0.8 mole) are heated together in toluene to cause reaction. The toluene is distilled off and replaced with xylene. Further distillation of xylene is followed by evaporation under vacuum to 60° C./1 mm. The resulting straw-color liquid is the tributylstannoxy titanium triisopropoxide and weighs 39 g. (77% yield). The product has an $n_D{}^{25}$ 1.4905 and is soluble in petroleum ether and in isopropanol.

Calc'd for $C_{21}H_{48}O_4SnTi$ (percent): Sn, 22.35; Ti, 9.01. Found (percent): Sn, 23.60; Ti, 8.82.

EXAMPLE C

Preparation of $Bu_3SnOTi(OPr)_3$

Tributyltin acetate (0.1 mole) and titanium isopropoxide (0.1 mole) are combined and heated together on an oil bath. A clear liquid results at approximately 100° C., and at 130° C. (pot temperature) a liquid boils briskly. The pot temperature is allowed to rise to 200° C. over 1.75 hours during which time 9.2 g. liquid ester ($n_D{}^{25}$ 1.3760) distills off (theory calls for 10.2 g.). The residual light yellow liquid is the tributylstannoxy titanium isopropoxide and gives $n_D{}^{25}$ 1.4870, $d_{25}$ 1.0949.

Calc'd for $C_{21}H_{48}OSnTi$ (percent): Sn, 22.36; Ti, 9.02. Found (percent): Sn, 23.48; Ti, 9.39.

Molecular wt. (calc'd), 531.19; ebullioscopic in benzene, 562.9.

EXAMPLE D

Preparation of $Bu_3SnOTi(OBu)_3$

Tributyltin acetate (0.1 mole) and distilled tetrabutyltitanate (0.1 mole) are heated together in a 100 ml. round bottom flask equipped for distillation under a protective atmosphere. On heating, two layers separate initially and then disappear at a pot temperature of 135° C. During the next 2.5 hours the temperature is maintained at 150–195° C. and 8 g. of a colorless ester ($n_D{}^{20}$ 1.3931 compared to literature value of 1.3951 for butyl acetate) distills off. Heating under vacuum at 60–80° C./1–3 mm. causes an additional 3.5 g. of ester to distill off (total 11.5 g. compared to 11.6 on theory). The residual yellow liquid is the tributylstannoxy titanium tri(n-butoxide) $n_D{}^{25}$ 1.4901; $d_{25}$ 1.082.

EXAMPLE E

Preparation of $Bu_3SnOB(OBu)_2$

Equimolar quantities (0.1 mole) of tributyltin acetate and tributyl borate are heated together in xylene and xylene is slowly distilled off to 150–170° C. Vacuum is then applied and the mass is heated at 100°–110° C./10 mm. for 1.5 hours, yielding 5.1 g. of a colorless distillate ($n_D{}^{22}$ 1.3928 compared with $n_D{}^{22}$ 1.3934 for butyl acetate). Heating is terminated when no further ester appears in the distillate. The residue in the flask is a xylene solution of the tributylstannoxy boron di(n-butoxide).

EXAMPLE F

Preparation of $Bu_3SnOV(O)(OPr)_2$

Equimolar quantities (0.1 mole) of tributyltin acetate and triisopropyl vanadate (the latter in the form of a 50% solution in n-heptane) are heated together to drive off a distillate containing ester. When distillation of ester ceases, vacuum is applied and the residue is heated at 70° C./1 mm. until no further ester appears. A black liquid ($d_4{}^{24}$ 1.153) remain in the flask and is a solution of the tributylstannoxy diisopropoxide vanadate.

Calc'd (percent): Sn, 24.20; V, 10.6. Found (percent): Sn, 20.20; V, 11.02.

EXAMPLE G

Preparation of $Bu_3SNOAl(OPr)_2$

Aluminum isopropoxide (0.196 mole) and tributyltin acetate (0.200 mole) are heated together and become a homogeneous solution at 150° C. At 160° C. (pot temperature) a colorless liquid begins to distill off. Heating is continued for 3.5 hours to 180° C. The colorless distillate weighs 12.5 g., has an $n_D{}^{28}$ 1.3735 and is shown by infrared spectra to be largely ester. Additional ester is removed at 50–60° C./1–3 mm. vacuum for 2.5 hours. The residue in the flask, a light yellow clear liquid, is the tributylstannoxy aluminum diisopropoxide, has an $n_D{}^{26}$ 1.4635 and $d_4{}^{26}$ 1.1122.

Calc'd (percent): Sn, 28.9; Al, 6.55. Found (percent): Sn, 26.5; Al, 6.41.

EXAMPLE H

Preparation of $Bu_3SnOSi(OE+)_2(CH=CH_2)$

Equimolar amounts (0.02 mole) of vinyltriethoxysilane and tributyltin acetate are heated together for two hours at 100°–130° C. and then for 2.5 hours at 150°–175° C. Ethyl acetate is evolved and collected; it amounts to 86% of theory. Then the mass is subjected to vacuum evaporation to remove additional ethyl acetate. The resulting mass is the sought compound, and is a light yellow liquid $n_D{}^{27}$ 1.4610, $d_4{}^{26}$ 1.108. Infrared analysis confirms the structure of the tributylstannoxy vinyl diethoxy silane.

EXAMPLES 1 AND 2

These examples compare the fungicidal activity of the compounds of Examples A and B against that of tributyltin acetate as control. The agar plate test was used. In this test, toluene solutions of the compounds, at active ingredient levels including 1% and 0.1%, were compared by the pad-plate modification of the agar plate technique (U.S.D.A. Circular No. 198, 1931). All dilutions were made in toluene. The tests were performed as follows:

One-half inch filter paper discs were saturated with the sample solutions and the toluence was evaporated off in a hot air oven at 200° C. The treated discs were placed upon the surface of Difco potato dexture agar, pH 5.6, which had been seeded with the spores of the test fungii. The agar plates were incubated for 48 hours at 25° C. after which the zones of inhibition surrounding the discs were measured in millimeters.

| Compound tested | Conc'n [1] | Zone of inhibition (mm.) | | | | |
|---|---|---|---|---|---|---|
| | | B.a* | P.i* | A.n* | R.n* | G.c* |
| $Bu_2(OPr)SnOTi(OPr)_3$ | 10.0 | 0 | 5 | 2 | 1 | 7 |
| $Bu_2(OPr)SnOTi(OPr)_3$ | 1.0 | 0 | 5 | ([2]) | ([2]) | 5 |
| $Bu_2(OPr)SnOTi(OPr)_3$ | 0.1 | 0 | 3 | 0 | 0 | 3 |
| $Bu_3SnOTi(OPr)_3$ | 12.8 | 14 | 16 | 13 | 11 | 16 |
| $Bu_3SnOTi(OPr)_3$ | 1.0 | 11 | 13 | 10 | 10 | 12 |
| $Bu_3SnOTi(OPr)_3$ | 0.1 | 7 | 10 | 7 | 6 | 10 |
| Control** | 5.6 | 4 | 8 | 4 | 6 | 7 |
| Do.** | 1.0 | 5 | 10 | 6 | 8 | 9 |
| Do.** | 0.1 | 5 | 10 | 6 | 8 | 9 |

[1] Concentration, wt. percent in toluene.
[2] Trace.
*Abbreviations representing the following fungii:
 B.a = *Botrytis allii*.
 P.i = *Penicillium italicum*.
 A.n = *Aspergillus niger*.
 R.n = *Rhizopus nigricans*.
 G.c = *Glomerella cingulata*.
**Tributyltin acetate.

EXAMPLES 3 AND 4

These examples illustrate results secured by testing the compounds of Examples C and D by the Serial Dilution Test, in comparison with tributyltin acetate as control. All tests were performed in Difco sabour and liquid medium at 25° C. with incubation for five days. Active ingredient concentrations in percent ranged from .000015 to .0078.

| Test fungii | $Bu_3SnOTi(OPr)_3$ | $Bu_3SnOTi(OBu)_3$ | Control |
|---|---|---|---|
| A.n | 0.000060 | 0.000060 | <0.000015 |
| B.a | <0.000015 | <0.000015 | <0.000015 |
| C.g* | <0.000015 | <0.000015 | <0.000015 |
| G.c | <0.000015 | <0.000015 | <0.000015 |
| P.i | <0.000015 | <0.000015 | <0.000015 |
| P.p** | <0.000060 | <0.000030 | <0.000015 |

*C.g = *Chaetomium globosum*.
**P.p = *Pullularia pullulans*.

EXAMPLES 5–8

These examples illustrate results secured by testing the compounds of Examples E–H by the serial dilution tests. The tests were performed as described in Examples 3 and 4 except that the active ingredient levels ranged from .000004% to 0.0078%, and incubation was for seven days at 25° C.

| Test fungii | Minimum inhibitory concentration, percent | | | |
|---|---|---|---|---|
| | ≡SnOB= (Ex. E) | ≡SnOV(O)= (Ex. F) | ≡SnOAl= (Ex. G) | ≡SnOSi≡ (Ex. H) |
| A.n | .000125 | .000062 | .000062 | .000225 |
| B.a | .000031 | .000135 | .000031 | .000004 |
| C.g | .000008 | .000008 | .000004 | .000008 |
| G.c | .000008 | .000031 | .000016 | .000031 |
| P.p | .000250 | .000250 | .000125 | .000250 |
| P.i | .000016 | .000016 | .000016 | .000062 |

EXAMPLES 9 AND 10

These examples illustrate results secured in mildew tests comparing the compounds of Examples C and D against tributyltin acetate as control. The tests illustrate the effectiveness of the compounds after a maximum of 14 days leaching in water, and were carried out in the following manner.

One inch square swatches of 8 oz. cotton duck were desized, dried, and then treated by immersing in toluene solutions containing indicated levels of the tests compounds. The treated swatches were removed from the water after 4, 7 and 14 days of leaching. As the samples were removed from the water they were dried and held in storage until the end of the last leaching period. They were all then inoculated with 0.1 ml. of a suspension of the test fungus and placed upon the surface of A.S.T.M. mineral salts agar. The resulting plates were incubated at 25° C., 100% R.H. and observed periodically for mildew development. Control swatches, similarly prepared but not leached (zero leaching time) were also included.

The arbitrary scale here used to evaluate the amount of mildew growth is as follows:

0 = no growth
+ = slight growth
++ = moderate growth
+++ = heavy growth

| Compound, concentration | Leaching time in days | Mildew development, days | | | | | | | | |
|---|---|---|---|---|---|---|---|---|---|---|
| | | A.n | | | P.i | | | P.p | | |
| | | 4 | 7 | 14 | 4 | 7 | 14 | 4 | 7 | 14 |
| Bu₃SnOTi(OPr)₃ | 0 | 0 | + | +++ | 0 | + | +++ | 0 | + | +++ |
| (.00006%) | 7 | | + | +++ | | + | +++ | | + | +++ |
| (.00006%) | 14 | | + | +++ | | + | +++ | | + | +++ |
| Bu₃SnOTi(OBu)₃ | 0 | 0 | 0 | +++ | 0 | 0 | +++ | | | |
| (.0006%) | 7 | | 0 | +++ | | 0 | +++ | | | |
| (.0006%) | 14 | | 0 | +++ | | 0 | +++ | | | |
| Bu₃SnOTi(OBu)₃ | 0 | | | | | | | 0 | + | +++ |
| (.0002%) | 7 | | | | | | | | + | +++ |
| (.0002%) | 14 | | | | | | | | + | +++ |
| Bu₃SnOAc | 0 | 0 | + | +++ | 0 | + | +++ | 0 | 0 | ++ |
| (.0002%) | 7 | | + | +++ | | + | +++ | | + | +++ |
| (.0002%) | 14 | | + | +++ | | + | +++ | | + | +++ |

EXAMPLE 11

This example illustrates the use of the ≡SnOTi≡ compound of Example D in polyvinylchloride resin as both a fungicide and heat stabilizer.

The following materials are used in the indicated proportions:

| | Test, g. | Control, g. |
|---|---|---|
| Polyvinylchloride resin [1] | 100.0 | 100.0 |
| Dioctyl phthalate (plasticizer) | 50.0 | 50.0 |
| Tributylstannoxy titanium tri-n-butoxide (Ex. D) | 3.0 | None |

[1] Geon 101EP.

The materials were milled together on a two-roll mill at 325° F. using lubricant as needed. Samples were taken from the resulting milled sheets and were pressed out under pressure. Comparison showed that whereas the unstabilized control sheet was severely discolored, the test sheet had only a mildly yellow coloration. There was no apparent "spew" of the stabilizer from the test sheet and a uniform, acceptable sheet was obtained.

Samples for the test sheet, when exposed outdoors under conditions favoring mildew and other fungal encroachment, showed that the presence of the stabilizer imparted fungicidal resistance.

EXAMPLES 12 AND 13

These examples illustrate the use of the ≡SnOTi≡ compounds of Examples C and D in treating paper, thereby to secure both water-repellency and fungicidal resistance. The Water Fotosize Test and the Cobb Test were used to evaluate the water-repellency qualities of the treated paper carrying about 0.5 lbs. of the compound per 3000 square feet of paper.

The Water Fotosize Test is conducted as follows:

Special handsheets containing 75% hardwood pulp and 25% softwood pulp are prepared in the usual laboratory equipment. A 3.5" x 7.0" sheet of the resulting paper is dipped into a 2% toluene solution of the water-repellent, removed and rolled free of excess solvent with a hard rubber roller on a glass surface. The treated sheet is then air-dried and finally conditioned at 73° F. and 50% R.H. for one day. Then the treated paper is placed under the surface of water in a container which is part of the Twing-Albert Fotosize Penetration Tester, and the number of seconds required to effect wetting or penetration is recorded automatically by a timer shut-off actuated by minimum transmittance of light through the sheet being tested.

Base (.03 N sodium hydroxide), acid (.03 N hydrochloric acid) and water are used in separate tests.

The Cobb Test (Test T–441 M–60, TAPPI Standards and Suggested Methods) was used with a five minute exposure period. The weight of water absorbed per square meter of the test sheet is reported. This test is suitable for determining the penetration of water into paper 0.0004 mil and over in thickness.

Table I summarizes the results of the tests:

TABLE I

| Compound | Weight applied, lbs./3,000 ft.² | Fotosize penetration, sec. | | | Cobb Test g./m.² | |
|---|---|---|---|---|---|---|
| | | Water | .03N NaOH | .03N HCl | | |
| Example C | 0.54 | >1,800 | 183 | >1,800 | 28.9 | 27.3 |
| Example D | 0.48 | >1,800 | >1,800 | >1,800 | 27.9 | 27.1 |

Examples 3 and 4 illustrate the fungicidal effectiveness of the compounds of Examples C and D in respect to treated articles such as are represented by the treated paper sheets hereof.

EXAMPLES 14–17

These examples illustrate the use of certain ≡SnOM≡ compounds of the invention in securing both fungicidal resistance and catalytic action in foamed urethane resin products. To compare various compounds at catalysts for this purpose, the following procedure was used:

Two hundred grams of a commercial hydroxyl-containing polyether resin (Niax Triol LG–56; a glycol polyether having an average molecular weight of about 3000 and an average hydroxyl number of 56) is weighed into a paper drinking cup and 3.0 grams of polydimethylsiloxane oil (L-502) plus 0.4-0.8 grams 0.2-0.4% by weight, based on the resin, of catalyst are added thereto and mixed therewith for two minutes by using a high speed 3-blade propellor-type mixer.

Diethylene triamine (Dabco) in the amount of 0.20 g. plus 0.30 g. N-ethylmorpholine are dissolved in 7.4 g. water in a small beaker. This solution is added to the mixture in the paper cup and stirred into it by mixing for one minute with said propellor mixer.

Then toluene diisocyanate (96.4 g.) is rapidly combined with the contents of the paper cup and the whole mass is poured into a suitable container.

A stopwatch is started at the time of pouring said mass into said container and the elapsed time (in seconds) required for the resulting foam to rise to its maximum height is recorded as "rise time." A control catalyst, e.g., stannous octoate, gives a "rise time" of 50-90 seconds.

The following table summarizes the results secured in various tests carried out in the foregoing manner, using the indicated compounds of the present invention as foam catalysts:

The antibacterial activity of the treated samples was measured initially after one AATCC No. 2 wash tests (each test is equivalent to 5 home washes) and after one and two dry cleanings (D.C.) with perchloroethylene. The Agar Plate Test against *Staphylococcus aureus* consisted of the AATCC Test Method 90-1962T. This measures the zone of inhibition around the specimen on the Agar. Qualitative ratings are given of the amount of inhibition which appears under the test specimen as follows:

| Rating: | Percent inhibition |
|---|---|
| E (Excellent) | 100 |
| G (Good) | 75 |
| F (Fair) | 50 |
| P (Poor) | 25 |
| U (Unsatisfactory) | 0 |

All tests were done in duplicate. The results are shown in Table I. Satisfactory portection against *Staphylococcus aureus* is obtained by tributylstannoxy titanium tribut-

TABLE III

| Example | Compound | Weight in g. | Rise time | Foam color | Max. internal temp., °C. | Catalyst rating |
|---|---|---|---|---|---|---|
| 14 | Bu₃SnOTi(OBu)₃ | 0.8 | 77 | O.W.¹ | 126 | Good. |
|  | Of Ex. D | 0.4 | 85 | O.W.¹ | 115 | Fair. |
| 15 | Bu₃SnOV(O)(OPr)₂ | 0.8 | 145 | Lt. gr.² | 65 | Do. |
|  | Of Ex. F | 0.4 | 135 | Sp. N.W.³ | 135 | Poor. |
| 16 | Bu₃SnOAl(OPr)₂ | 0.8 | 72 | White | 105 | Excellent. |
|  | Of Ex. G | ⁴ 0.8 | 65 | do | 115 | Do. |
|  |  | ⁵ 0.8 | 135 | do | 96 | Fair. |
|  |  | 0.4 | 82 | do | 114 | Excellent. |
| 17 | Bu₃SnOSi(CH=CH₂)(OEt)₂ | 0.8 | 80 | do | 110 | Do. |
|  | Of Ex. H | 0.4 | 110 | do | 108 | Good. |

¹ Off White.
² Light green.
³ Speckled, near white.
⁴ No N-ethylmorpholine used.
⁵ No diethyleneytriamine used.

In all tests, the secured foams were of acceptable quality except in those instances where the color was altered from the desired white. Bacteriological tests of the foams indicated resistance to a variety of microorganisms.

EXAMPLE 18

Antibacterial testing of treated cotton cloth

All treatments were made on Kier boiled and bleached 80 x 80 cotton print cloth. Samples of cloth were padded through toluene or isopropanol solutions of the chemical, tributylstannoxy, titanium tri-n-butoxide, at 80% wet pickup. They were framed to size and dried for 5 minutes at 250° F. in a closed air circulating oven. A second set was cured for 5 minutes at 300° F. after the drying step. Tests were made on the dried only and also on the dried and cured samples.

oxide which possesses a tin content lower than the control; namely, bis(tri-n-butyltin) oxide.

| Compound | Curing | Initial | 1 A² Wash | Agar Plate-Test 1 D.C. | Staph Aureus 2 D.C. |
|---|---|---|---|---|---|
| 0.1% A | None | E* | G* | E* | G* |
| 0.1% A | 5 min./300° F | E* | G* | G* | F/P* |
| 0.1% B (control) | None | E | G | G | F/G |
| 0.1% B | 5 min./300° F | E | F | F | F/G |
| Blank | None | U | U | U | U |

*The same ratings were obtained when application solvent was isopropyl alcohol
A = Tributylstannoxy Titanium Tri-n-Butoxide.
B = Bis(tri-n-butyltin)oxide.
A² Wash is equivalent to five home washes.
D.C. = Dry cleaning.

EXAMPLES 19-22

Marine anti-foulant chemicals

Table V shows the results of antifoulant screening of various tributylstannoxy metal alkoxide compounds. Carbon plates are impregnated with a solution or slurry of the compound and these were immersed in sea water at a Miami Beach harbor. The amount of fouling is recorded after four months. The carbon blocks were free of organisms after this exposure whereas a control with no treatment was completely fouled.

TABLE V.—ANTIFOULANT EVALUATION

| Example | Compound | Percent Fouling* on Surface of Treated Block | | | | | | | | |
|---|---|---|---|---|---|---|---|---|---|---|
| | | Barn. | E.B. | Al. | Bug. | Hyd. | Oy. | T.W. | Tun. | Slime |
| | Blank | b | b | b | b | b | b | b | b | b |
| 19 | Bu$_3$SnOTi(OBu)$_3$ | 0 | 0 | 0 | 0 | 0 | 0 | 0 | 0 | 0 |
| 20 | Bu$_3$SnOTi(OPr)$_3$ | 0 | 0 | 0 | 0 | 0 | 0 | 0 | 0 | 0 |
| 21 | Bu$_3$SnOV(O)(OPr)$_2$ | 0 | 0 | 10 | 0 | 0 | 0 | 0 | 2 | 0 |
| 22 | Bu$_3$SnOAl(OPr)$_2$ | 0 | 0 | 0 | 0 | 0 | 0 | 0 | 0 | 0 |

*Forms represented by the abbreviations are: Barnacles, Encrusting Bryozoans, Algae, Bugula, Hydroids, Oysters, Tube Worms, Tunicates, Microorganism Slime film.
b=Completely fouled. Overgrowths prevent assessment of actual numbers or percent surface covered by individual forms.

Having described our invention, what we claim is:

1. The method of rendering a solid phase fibrous substrate resistant to fungi which comprises the step of incorporating a small effective amount of at least one active compound selected from the class consisting of tributylstannoxy titanium triisopropoxide and tributylstannoxy titanium tri-n-butoxide into at least surface portions of the fibrous substrate.

2. The method of claim 1 wherein said fibrous substrate is a textile.

3. Fungi resistant solid phase fibrous substrates made in accordance with the method of claim 1.

References Cited

UNITED STATES PATENTS 3,307,973　3/1967　Gibbons _____ 117—154
3,334,119　8/1967　Cohen _____ 260—429

JAMES V. COSTIGAN, Primary Examiner